United States Patent [19]

Matzner et al.

[11] Patent Number: 4,870,155
[45] Date of Patent: Sep. 26, 1989

[54] NOVEL POLY (ETHERIMIDE) COMPOSITIONS

[75] Inventors: Markus Matzner, Edison; Paul A. Winslow, Millington, both of N.J.; Donald M. Papuga, Ridgefield, Conn.

[73] Assignee: Amoco Corporation, Chicago, Ill.

[21] Appl. No.: 127,719

[22] Filed: Dec. 2, 1987

[51] Int. Cl.[4] .................. C08G 8/02; C08G 14/00
[52] U.S. Cl. .................... 528/171; 528/125; 528/128; 528/172; 528/228; 528/229
[58] Field of Search ............. 528/171, 353, 172, 125, 528/128, 228, 229

[56] References Cited

U.S. PATENT DOCUMENTS

| | | | |
|---|---|---|---|
| 4,320,224 | 3/1982 | Rose et al. | 528/128 |
| 4,526,838 | 7/1985 | Fujioka et al. | 528/178 |

*Primary Examiner*—John Kight
*Assistant Examiner*—M. L. Moore
*Attorney, Agent, or Firm*—Frederick S. Jerome; William H. Magidson; Ralph C. Medhurst

[57] ABSTRACT

Described herein are random poly(etherimide) containing ether-imide units and aryl ether and/or aryl ether ketone units. These copolymers are produced by the reaction of the appropriate activated dinitro- and/or dihalobenzenoid aromatic compounds with diphenols, and/or by the self condensation of halophenols and/or nitrophenols, whose halogen atom and nitro group are activated towards nucleophilic substitution reactions.

23 Claims, No Drawings

NOVEL POLY (ETHERIMIDE) COMPOSITIONS

FIELD OF THE INVENTION

This invention is directed to novel poly(etherimide) compositions and to processes for the preparation thereof. The novel materials described herein are copolymers containing ether-imide units and aryl ether and/or aryl ether ketone units. These copolymers are produced by the reaction of the appropriate activated dinitro- and/or dihalobenzenoid aromatic compounds with diphenols, and/or by the self condensation of halophenols and/or nitrophenols, whose halogen atom and nitro group are activated towards nucleophilic substitution reactions. The polymerizations are performed at high temperatures, in an aprotic solvent, and in the presence of a base. The base comprises sodium carbonate or bicarbonate and a second alkali metal carbonate or bicarbonate wherein the alkali metal of the second carbonate or bicarbonate has a higher atomic number than that of sodium. The polymerizations may also be performed in the presence of a base comprising sodium carbonate and/or bicarbonate and an alkali metal halide selected from potassium, rubidium or cesium fluoride or chloride, or combinations thereof. In another embodiment, the base is a mixture of (a) a lithium and/or an alkaline earth metal carbonate or bicarbonate, and (b) a sodium, potassium, rubidium, and/or a cesium carbonate or bicarbonate. The base may also be comprised of sodium or an alkaline earth metal carbonate or bicarbonate and a potassium, rubidium or cesium salt of an organic acid. In still another process embodiment, the base comprises sodium or an alkaline earth metal carbonate or bicarbonate and a lithium, sodium or alkaline earth metal salt of an organic acid, optionally in combination with a catalytic amount of a potassium, cesium or rubidium salt catalyst. All of the above reactions may be advantageously performed in the presence of small amounts of cupric or cuprous ions. These processes yield high molecular weight poly(etherimide) copolymers, which are gel-free, and display excellent mechanical properties, excellent thermal stability and chemical resistance, and very good melt-fabricability.

BACKGROUND OF THE INVENTION

This invention relates to a novel class of poly(etherimides). The subject poly(etherimides) display a unique combination of high temperature properties, toughness and melt processability. They are suitable for molding, extrusion, and coating applications. They are also of interest as components of blends, as filled materials and in composites. Processes for the preparation of these poly(etherimide) copolymers are also described.

U.S. Pat. Nos. 3,838,097; 3,847,867; 3,847,869; 3,905,942; 3,983,093, describe poly(etherimides) of the formula:

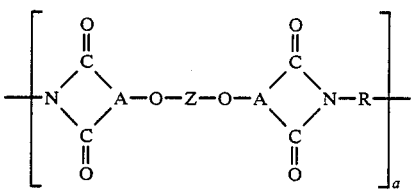

where a represents a whole number in excess of 1, e.g., 10 to 10,000 or more, the group —O—A< is selected from:

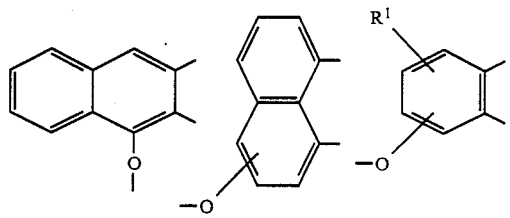

R' being hydrogen, lower alkyl or lower alkoxy, preferably the poly(etherimide) includes the latter —O—A< group where R' is hydrogen such that the poly(etherimide) is of the formula:

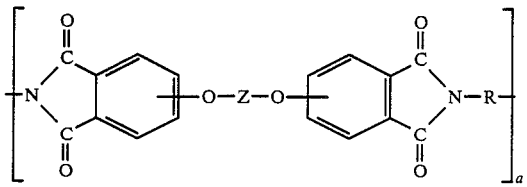

and the divalent bonds of the —O—Z—O radical are in the 3,3'; 3,4'; 4,3'; or the 4,4' position. Z is a member of the class consisting of

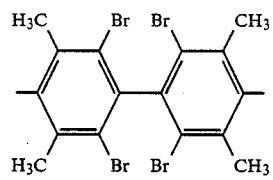

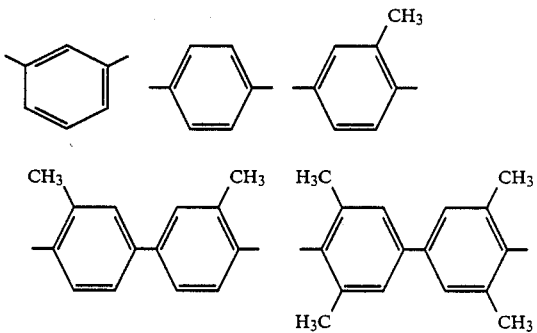

-continued

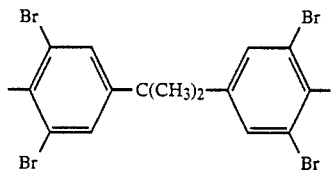

and (2) divalent organic radicals of the general formula:

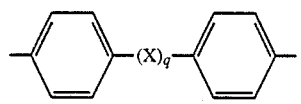

where X is a member selected from the class consisting of divalent radicals of the formulas,

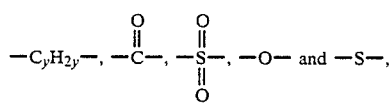

where q is 0 or 1; y is a whole number from 1 to 5; R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$, alkylene terminated polydiorganosiloxane, and (3) divalent radicals included by the formula

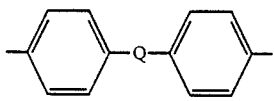

where Q is a member selected from the class consisting of a direct bond or

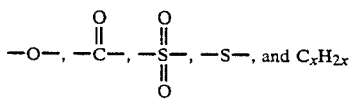

where x is a whole number from 1 to 5 inclusive. Particularly preferred poly(etherimides) include those where —O—A< and Z respectively are:

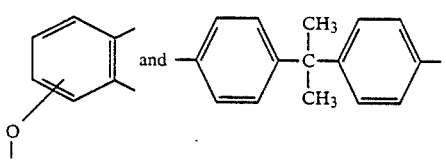

and R is selected from:

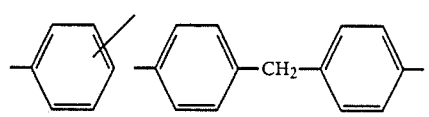

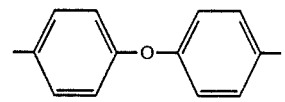

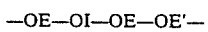

The poly(etherimides) where R is metaphenylene are most preferred.

One of the principal drawbacks of these polymers is their lack of good melt fabricability which severely limits their usefulness.

It was unexpectedly found that this difficulty can be obviated by using copoly(etherimides) which contain aryl ether and/or aryl ether ketone units in their chains.

U.S. Pat. No. 4,540,748 describes poly(etherimide) copolymers based on oligomeric diamines having molecular weights > 1,500. These diamines may be a diamino-terminated aliphatic, aliphatic-aromatic or heterocyclic polyamide, or a diamino-terminated poly(aryl ether) or poly(aryl ether ketone).

U.S. Pat. No. 4,642,327, issued Feb. 10, 1987 in the name of Markus Matzner and Donald M. Papuga, entitled "Novel Polyetherimides", commonly assigned, describes poly(etherimides) based on oligomeric diphenols having molecular weights > 1,500. The oligomeric diphenols are selected from the class consisting of dihydroxy-terminated poly(phenylene oxides), dihydroxy-terminated poly(aryl ethers), and dihydroxy-terminated poly(aryl ether ketones).

The above poly(etherimide) copolymers, made either from the diamino- or from the dihydroxy-terminated oligomers, incorporate within their chains segments of well-defined lengths. These segments have a molecular weight of at least 1,500. The materials are, therefore, block copolymers. On the other hand, the products of the instant invention are one-phase random or random-block copolymers.

THE INVENTION

The random or random-block copolymers of the instant invention are of the general formula

—OE—OI—OE—OE'— wherein I is the residuum of one or more diimide benzenoid compounds; E is the residuum of a dihydric phenol or of a mixture of dihydric phenols; and E, is the residuum of an activated dihalo- and/or dinitrobenzenoid compound or a mixture of such activated compounds; all of said residua being valently bonded to the ether oxygens through aromatic carbon atoms.

The group I is selected from one or more of the following:

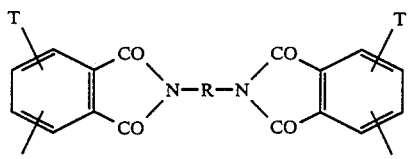
(1)

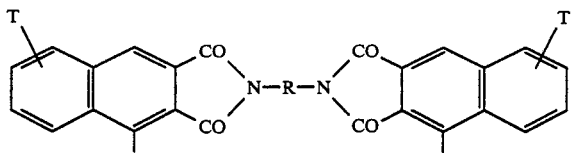
(2)

or isomers thereof wherein the ether bonds are ortho or para to the imide carbonyls;

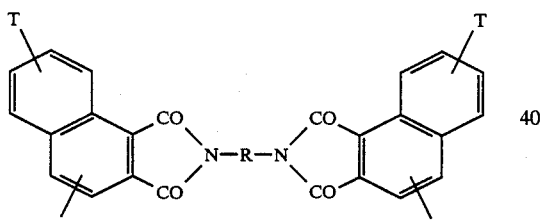
(3)

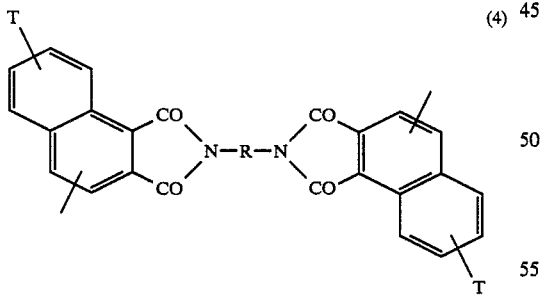
(4)

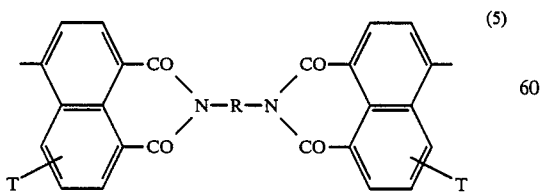
(5)

or isomers thereof wherein the ether bonds are ortho or para to the imide carbonyls; R is as previously defined and the groups E, E, and T are as defined below.

The novel copolymers are prepared by the reaction of (a) a compound selected from the group of one or more of the following

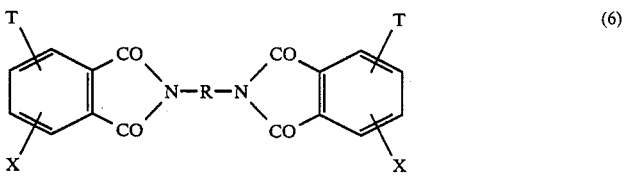
(6)

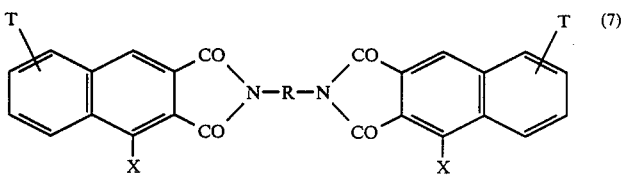
(7)

or isomers thereof wherein the groups X are ortho or para to the imide carbonyls

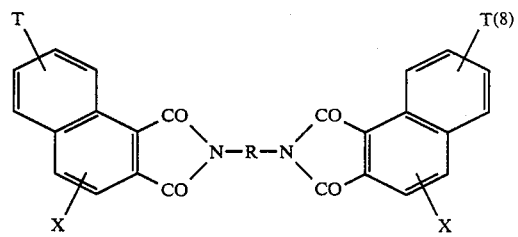
(8)

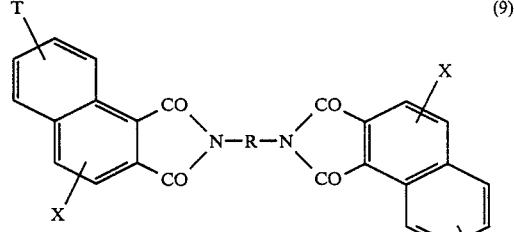
(9)

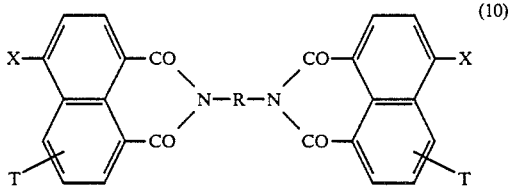

or isomers thereof wherein the groups X are ortho or para to the imide carbonyls wherein X is a nitro group or a halogen atom, R is as previously defined and T is hydrogen, lower alkyl or lower alkoxy; with (b) a diphenol or a mixture of diphenols; and (c) an activated dihalobenzenoid and/or dinitrobenzenoid compound or mixtures thereof.

The activated dihalo- and/or dinitrobenzenoid compound (c) and the corresponding amounts of the diphenol(s) (b), may be partially or totally replaced by a nitro- or halophenol or mixtures thereof, wherein the nitro or halo groups are activated by an electron withdrawing group in the positions ortho or para thereto.

The compounds (6), (7), (8), (9), and (10) can be prepared via the reaction of 2 moles of the corresponding anhydride, for example of (11), with one mole of the diamine (12), as described in U.S. Pat. No. 3,920,697.

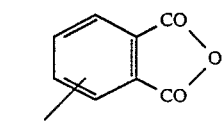

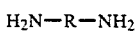

The group R Of the diamine (12) is a divalent aromatic radical selected from the class consisting of (1) aromatic hydrocarbon radicals having from 6 to 20 carbon atoms and halogenated derivatives thereof, (2) alkylene radicals and cycloalkylene radicals having from 2 to 20 carbon atoms, $C_2$ to $C_8$ alkylene terminated polydiorganosiloxanes, and (3) divalent radicals of the formula

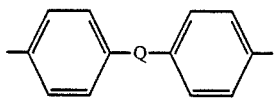

where Q is a member selected from the class consisting of a direct bond or

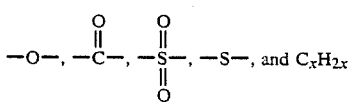

where x is a whole number from 1 to 5 inclusive. Organic diamines included by formula (12) are, for example,
m-phenylenediamine;
p-phenylenediamine;
4,4'-diaminodiphenylpropane;
4,4'-diaminodiphenylmethane; benzidine;
4,4'-diaminodiphenyl sulfide;
4,4'-diaminodiphenyl sulfone;
4,4'-diaminodiphenyl ether;
1,5-diaminonaphthalene;
2,6-diaminonaphthalene;
2,7-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
4,4'-diaminobenzophenone;
nonamethylenediamine;
decamethylenediamine;
bis(3-aminopropyl)tetramethyldisiloxane; and
bis(4-aminobutyl)tetramethyldisiloxane.
meta phenylenediamine, p-phenylenediamine;
2,2-bis(p-aminophenyl)propane;
4,4'-diaminodiphenyl-methane;
4,4'-diaminodiphenyl sulfide;
4,4'-diaminodiphenyl sulfone;
4,4'-diaminodiphenyl ether;
1,5-diaminonaphthalene, benzidine,
3,3'-dimethylbenzidine, and
3,3'-dimethoxybenzidine; or mixtures of these diamines are preferred.

Note that in compounds of formula (10) the group X may be attached to either ring and located ortho or para to one of the bonds of the imide carbonyl groups.

The aryl ether units of the instant invention are of the formula

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Aromatic polyethers containing such units are described in, for example, U.S. Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1-bis(4-hydroxyphenyl)-2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—), carbonyl

sulfone

or hydrocarbon residue in which the two phenolic nuclei are joined to the same or different carbon atoms of the residue.

Such dinuclear phenols can be characterized as having the structure:

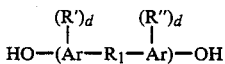

wherein Ar is an aromatic group and preferably is a phenylene group, R' and R" can be the same or different inert substituent groups such as alkyl groups having from 1 to 4 carbon atoms, aryl, halogen atoms, i.e., fluorine, chlorine, bromine or iodine, or akoxyl radicals having from 1 to 4 carbon atoms, the d's are independently integers having a value of from 0 to 4, inclusive, and $R_1$ is representative of a bond between aromatic carbon atoms as in dihydroxyl-diphenyl, or is a divalent radical, including for example, radicals such as

—O—, —S—, —S—S— —SO—, —SO₂, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both Ar groups.

Examples of specific dihydric polynuclear phenols include among others:
the bis-(hydroxyaryl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane
2,2-bis-(2-isopropyl-4-hydroxyphenyl)propane
2,2-bis-(4-hydroxynaphthyl)propane
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoro-propane and the like;
di(hydroxaryl sulfones such as
bis-(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as
bis-(4-hydroxyphenyl)ether,
the 4,3'-, 4,2'-, 2,2'-, 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.
Other useful diphenols are, for example, the naphthalene diols, and the mononuclear diphenols such as hydroquinone or resorcinol. Dihydroxydiphenyls such as 4,4'-biphenol are also very useful.

As herein used, the E term is defined as being the "residuum of the dihydric phenol" of course refers to the residue of the dihydric phenol after the removal of the two aromatic hydroxyl groups. Thus, as is readily seen, these aryl ether units contain groups of the residuum of dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical. Preferred are the strongly activating groups such as the sulfone group $$(-\underset{\underset{O}{\|}}{\overset{\overset{O}{\|}}{S}}-),$$

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:

(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group $-\underset{\underset{O}{\|}}{\overset{\overset{O}{\|}}{S}}-$;

the carbonyl group $-\overset{\overset{O}{\|}}{C}-$;

the vinylene group $-\overset{\overset{H}{|}}{C}=\overset{\underset{H}{|}}{C}-$;

the sulfoxide group $-\overset{\overset{O}{\|}}{S}-$;

the azo group $-N=N-$;

the saturated fluorocarbon groups $-\overset{\overset{CF_3}{|}}{\underset{\underset{CF_3}{|}}{C}}-$, $-CF_2CF_2CF_2-$;

organic phosphine oxides $-\overset{\overset{O}{\|}}{\underset{\underset{R'''_3}{|}}{P}}-$;

where $R'''_3$ is a hydrocarbon group and the ethylidene group $$\underset{-C-}{\overset{A-C-A,}{\|}}$$

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred aryl ether units of this invention are those prepared using the dihydric polynuclear phenols of the formulae (13)–(17) including the derivatives thereof which are substituted with inert substituent groups;

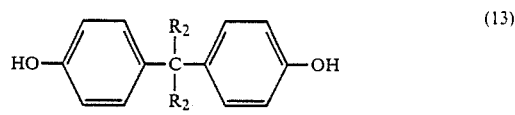
(13)

in which the $R_2$ groups represent independently hydrogen, lower alkyl, aryl and the halogen substituted groups thereof, which can be the same or different;

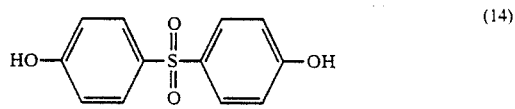
(14)

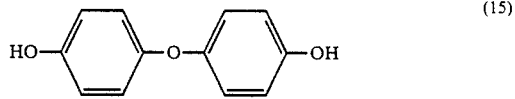
(15)

(16)

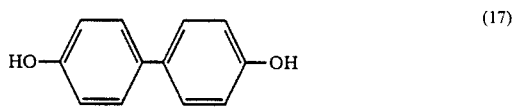
(17)

and substituted derivatives thereof.

It is also contemplated in this invention to use a mixture of two or more different dihydric phenols to accomplish the same ends as above. Thus, when referred to above, the —E— residuum in the polymer structure can actually be the same or different aromatic residua.

The preferred dihalobenzenoid compounds are (18), (19), (20), and (21); they may carry inert substituent groups.

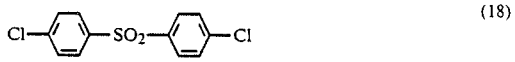
(18)

-continued

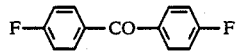
(19)

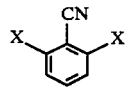
X = Cl or F
(20)

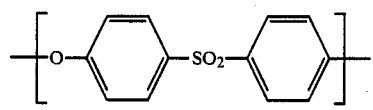
(21)

The most preferred aryl ether units are of the formulae (22), (23), (24), and (25).

groups interconnected by aromatic diradicals such as 1,4-phenylene. They may be characterized more specifically by one or more of the following formulae:

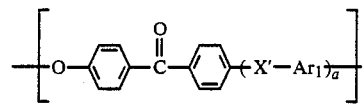
[I]

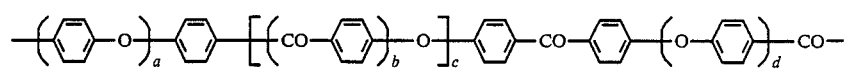
[II]

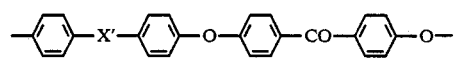
[III]

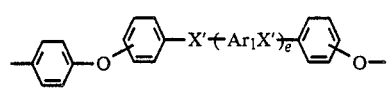
[IV]

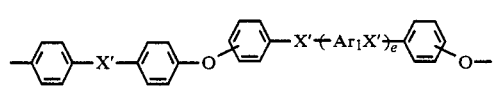
[V]

wherein $Ar_1$ is independently a divalent aromatic radical selected from phenylene, biphenylene, or naphthylene, X' is independently O,

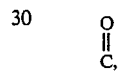

$SO_2$, or a direct bond, and a is an integer of from 1 to 4; b, c, d and e are 0 to 1 and preferably d is 0 when b is 1.

Preferred aryl ether ketone units are those having the formulae:

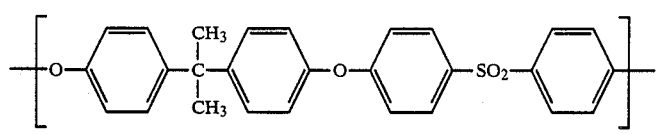
(22)

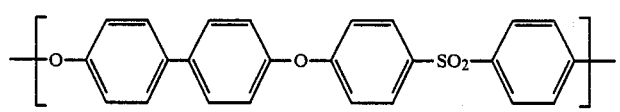
(23)

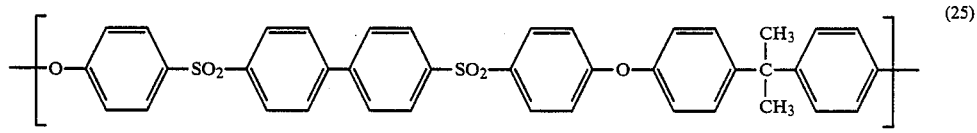
(24)

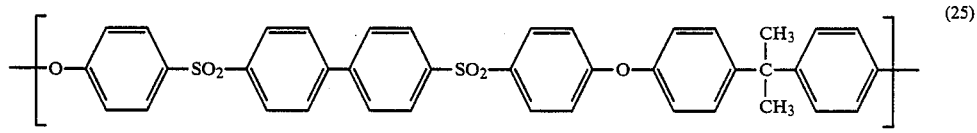
(25)

The aryl ether ketone units of the instant invention are comprised of ether oxygen and keto (carbonyl)

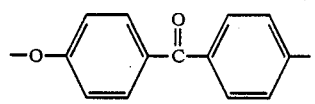

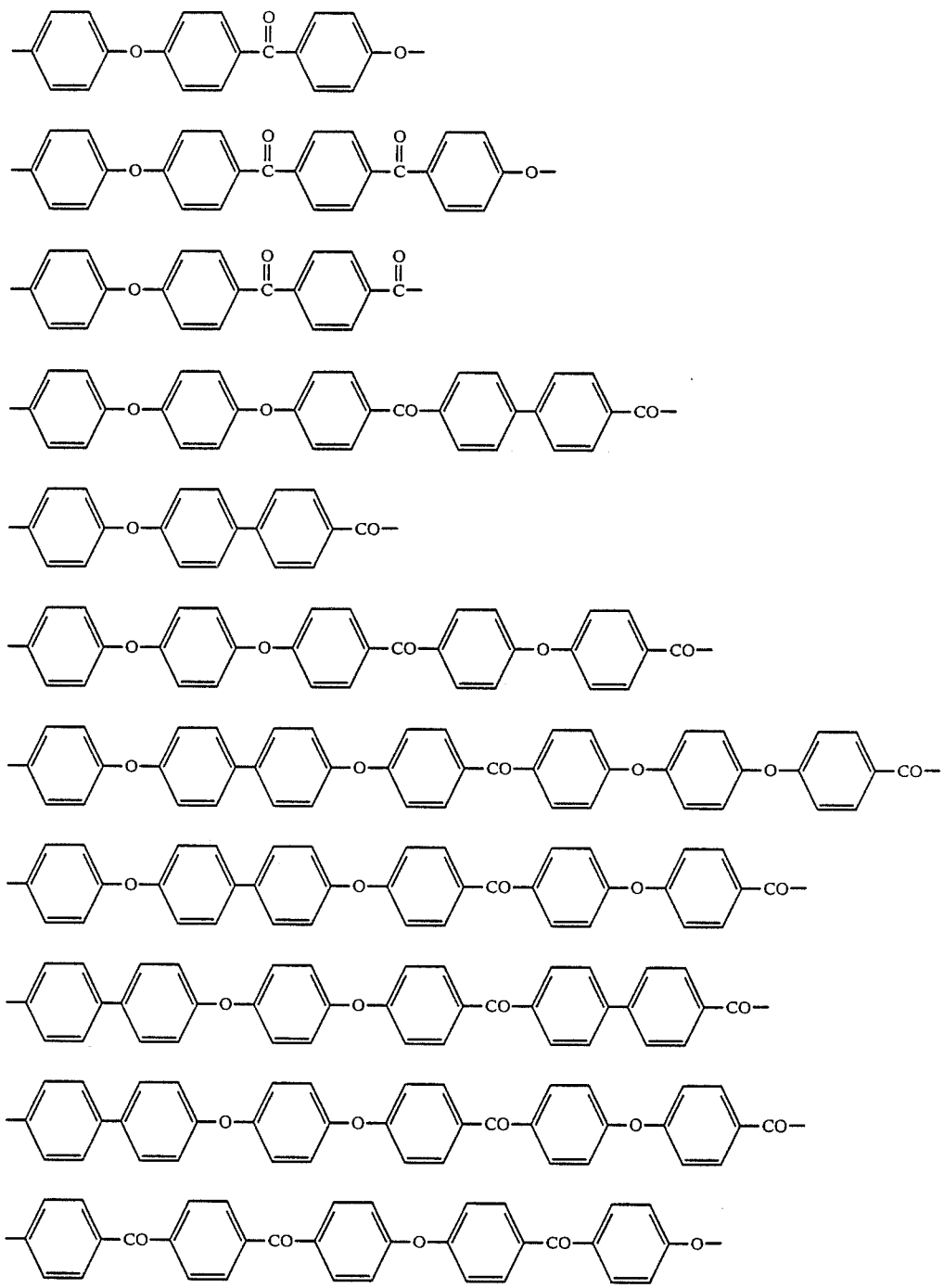

Thus, the aryl ether ketone units are of the formula —OE—OE'— and are obtained by reacting a bisphenol and a dihalobenzenoid compound and/or a halo-phenol. The bisphenols useful for preparing the aryl ether ketone units are of the formula:

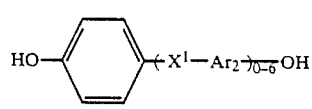

wherein the X's can be independently O,

SO$_2$, or a direct bond and the Ar$_2$'s can be independently a divalent radical selected from phenylene, biphenylene or naphthylene, most preferably 1,4-phenylene.

The dihalobenzenoid compounds useful for the preparation of the aryl ether ketone units may be depicted as follows:

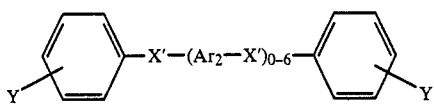

wherein Y is halogen, preferably fluorine or chlorine, the Y's may be the same or different and are ortho or para to the X'; $Ar_2$ and X' are as defined above with the proviso that the X's ortho or para to the Y's are electron withdrawing groups, i.e.,

or $SO_2$. In the preferred embodiment, each aromatic radical is para substituted and most preferably, 1,4-phenylene.

The useful halophenols may be depicted as follows:

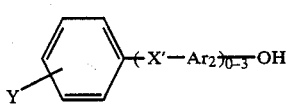

wherein Y, X' and $Ar_2$ are as defined above with the proviso that the X's ortho or para to Y are electron-withdrawing groups, i.e,

or $SO_2$.

Preferred bisphenols include one or more of the following:
hydroquinone,
4,4'-dihydroxybenzophenone,
4,4'-dihydroxybiphenyl,
4,4'-dihydroxydiphenyl ether,
4,4'-dihydroxydiphenyl sulfone,
4,4'bis(p-hydroxybenzoyl)biphenyl,
1,4-bis(p-hydroxybenzoyl)benzene, and
4,4'-bis(4-hydroxyphenylsulfonyl)biphenyl.
Preferred dihalobenzenoid and halophenol compounds include one or more of the following:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,
1,4-bis(4'-fluorobenzoyl)benzene,
1,3-bis(4'-fluorobenzoyl)benzene,
4,4'-dichlorodiphenyl sulfone,
4,4'-bis(p-halobenzoyl)biphenyl,
4,4'-difluorodiphenyl sulfone, and
4-chloro-4'-hydroxydiphenyl sulfone.

The copoly(etherimides) contain at least 10 mole percent and preferably at least 20 mole percent of imide units, based on the total halo or nitro and phenolic reactants.

The preparation of the copoly(etherimides) of the instant invention is conducted at high temperatures, in an aprotic solvent, in the presence of a base. The bases useful in the polymerizations may be one of the following:

(a) a mixture of sodium carbonate of bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

As stated above, the amount of the second (higher) alkali metal carbonate or bicarbonate employed is such that there are 0.001 to about 0.2 gram atoms of the alkali metal of higher atomic number per gram atom of sodium.

Thus, when using a mixture of carbonates, e.g., sodium carbonate and cesium carbonate, there should be 0.1 to about 20 moles of cesium carbonate per 100 moles of sodium carbonate. Likewise, when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

Preferably, from 0.005 to 0.1 gram atoms of the alkali metal of the second alkali metal carbonate or bicarbonate per gram atom of sodium is used.

(b) a combination of sodium carbonate and/or bicarbonate and an alkali metal halide selected from potassium, rubidium or cesium fluoride or chloride, or combinations thereof. In a preferred embodiment from about 0.001 to about 0.5 atoms of alkali metal (derived from the alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

(c) a combination of (1) lithium and/or an alkaline earth metal carbonate; and (2) sodium, potassium, rubidium, or cesium carbonate. Mixtures of carbonates of groups (1) and/or (2) can be used. Also, bicarbonates may be employed instead of the carbonates.

The ratio of the carbonates (1) to (2) can vary from 40:60 to 99:1 and is preferably in the range of 80:20 to 95:5. Calcium, strontium, and barium carbonates are the preferred alkaline earth metal carbonates. Particularly preferred are calcium carbonate (chalk) and the double calcium/magnesium carbonate (dolomite). As far as the carbonates of group (2) are concerned, sodium and potassium carbonates are preferred. (d) a combination of sodium or an alkaline earth metal carbonate or bicarbonate and a potassium, rubidium or cesium salt of an organic acid. Salts of any organic acid are useful. Thus, one may use the potassium, rubidium, or cesium salts of aliphatic linear or branched acids such as:

formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethyl-heptanoic, 3-propyl-5,6-dimethyl nonanoic and other similar acids.

Salts of halo-substituted aliphatic acids such as monochloro-, dichloro-, and trichloroacetic, 2-chloropropionic, 3,5-dichloroheptanoic, bromoacetic, 3-fluorobutyric, and 3,3,3-trichloro propionic acids.

Salts of aromatic mono- or polynuclear acids such as benzoic, toluic, 3,4-dimethylbenzoic, 2-chlorobenzoic, 3,4-dichlorobenzoic, 2-bromobenzoic, 2-chloro-4-methylbenzoic, 2-fluoro-3-ethylbenzoic, other alkyl and/or halo-substituted benzoic acids, the naphthalene carboxylic acids, alkyl-substituted naphthalene carboxylic acids such as 3-methyl-naphthalene-1-carboxylic acid, 6-ethyl-naphthalene-2-carboxylic acid;

halo-substituted naphthalene carboxylic acids such as 4-chloro-naphthalene-2-carboxylic acid, phenanthrene and anthracene carboxylic acids and the like.

Salts of arylaliphatic acids such as phenylacetic, diphenyl acetic, 1-naphthyl acetic, 2-naphthyl acetic, 4-chlorophenyl acetic, 4-methylphenyl acetic, 3-bromo-1-naphthyl acetic, 4-chloro-2-naphthyl acetic, 3-(6-chloro-1-naphthyl)-propionic, 3-(4-ethylphenyl)butyric, 3-methyl-4-(2-ethyl-4-chlorophenyl)butyric, 3-phenyl-hexanoic, and 7-phenylnonanoic acids.

Salts of heterocyclic carboxylic acids such as furane-2-carboxylic, furane-3-carboxylic, thiophene-2-carboxylic, thiophene-3-carboxylic, the pyridine, quinoline and isoquinoline carboxylic acids.

Salts of alkyl, aryl, and halo-substituted heterocyclic acids such as 2-methylfurane-3-carboxylic, 4-chloro-pyridine-2-carboxylic, 2-methyl-4-oxazole carboxylic, and 2-propyl-pyrazine-3-carboxylic acids.

Salts of dicarboxylic acids such as oxalic, malonic, succinic, adipic, suberic, azelaic, α-bromo-glutaric, β, β'-dimethyl-glutaric, α, α'-dichlorosuberic, maleic, and fumaric acids.

Salts of aromatic and heterocyclic dicarboxylic acids such as phthalic, isophthalic, terephthalic, naphthalene-1,2-dicarboxylic, naphthalene-2,3-dicarboxylic, naphthalene-1,5; 1,6; 1,7; 1,8; 2,4; 2,5; and 2,6-dicarboxylic, pyridine-2,3-dicarboxylic, furane-2,3-dicarboxylic acids and the like.

Salts of aliphatic, aromatic, and heterocyclic sulfonic and sulfinic acids such as methane sulfonic, ethane sulfonic, propane sulfonic, benzene sulfonic, benzene sulfinic, 1-naphthalene sulfonic, 2-naphthalene sulfonic, 1-naphthalene sulfinic, 1,8-naphthalene disulfonic, 2,6-naphthalene disulfonic, 4-methyl-benzene sulfinic, p-toluene sulfonic, 3,4-dichloro-benzene sulfonic, 6-chloro-naphthalene-1-sulfonic, quinoline-2-sulfonic, 4-pyridine sulfonic, 2-thiophene sulfonic, 3-thiophene sulfonic, 3-methyl-2-furane sulfinic, 3-propyl-2-furane-sulfonic acids and the like.

Salts of aliphatic, aromatic, and heterocyclic phosphonic and phosphinic acids such as methane phosphonic, ethane phosphonic, benzene phosphinic, benzene phosphonic, 1-naphthalene phosphonic, 2-naphthalene phosphonic, 1-naphthalene phosphinic, 1,8-naphthalene diphosphonic, 2,6-naphthalene diphosphonic, 4-methyl-benzene phosphinic, 4-ethyl-benzene phosphonic, 3,4-dichloro-benzene phosphonic, 3,4-dibromobenzene phosphonic, 3-chloro-4-methyl benzene phosphonic, 6-chloro-1-naphthalene phosphonic, 2-quinoline phosphonic, 2-thiophene phosphonic, 3-thiophene phosphonic, 3-thiophene phosphinic, 3-chloro-2-furane phosphinic, 3-propyl-2-furane phosphonic acids and the like.

Mixed salts such as for example mixtures of potassium and rubidium acetates or mixtures of potassium acetate and potassium benzene sulfonate and the like can also be used. The preferred salts are postassium formate, acetate, propionate, oxalate, benzoate, benzene sulfonate and p-toluene sulfonate.

The sodium or alkaline earth metal carbonate or bicarbonate and the potassium, rubidium, or cesium organic salt are used such that the ratio of the higher alkali metal to sodium or alkaline earth metal therein is from about 0.001 to about 0.5, preferably from about 0.001 to about 0.20, and most preferably from 0.01 to about 0.1. In another preferred embodiment, from 0.001 to about 0.5 atoms of alkali metal (derived from the alkali metal organic salt) is used for each phenol group. Of course, it is well known to those skilled in the art that cesium is a more active metal and potassium is a less active metal, so that less cesium and more potassium are used. It is preferred that the ratio of carbonate and bicarbonate anions to the phenolic groups be about 0.5 to 1.0, respectively. However, higher and lower ratios are also possible.

(e) a combination of sodium or an alkaline earth metal carbonate or bicarbonate and a lithium, sodium or alkaline earth metal salt of an organic acid, optionally in combination with a catalytic amount of a potassium, cesium, or rubidium salt catalyst. The salts of organic acids that are useful are the same as those listed above. Preferred salts are the formates, acetates, propanoates, benzoates, benzene sulfonates and p-toluene sulfonates. Sodium salts are most preferred.

The polycondensation is preferably conducted in the presence of an essentially stoichiometric amount of sodium or alkaline earth metal carbonate or sodium or alkaline earth metal bicarbonate, i.e., the ratio of carbonate and bicarbonate anions to the phenolic groups should be about 0.5 and 1.0, respectively. However, a deficiency or an excess of carbonate or bicarbonate can also be used; the amount of the lithium, sodium, or alkaline earth metal salt is in the range of from about 0.01 to about 0.5 moles per mole equivalent of sodium or alkaline earth metal carbonate or bicarbonate; and preferably from about 0.02 to about 0.3 moles per mole equivalent. The amount of the lithium, sodium, or alkaline earth metal salt can be adjusted to obtain the desired reaction rate and, hence, these salts may be used in amounts greater or lesser than the ranges stated herein.

As indicated above, this latter polymerization can be catalyzed by the addition of a catalytic amount of a potassium, cesium or rubidium salt. In this process variation, the polycondensation of a bisphenol with a dinitro or dihaloaromatic monomer (and/or the polycondensation of a nitro or halophenol) is, once again, conducted in the presence of an essentially stoichiometric amount of sodium or alkaline earth metal carbonate or bicarbonate, although a deficiency or an excess of carbonate or bicarbonate can be used. The amount of the lithium, sodium, or alkaline earth metal salt is from about 0.005 to about 0.5 moles per mole equivalent of sodium or alkaline earth metal carbonate or bicarbonate; and preferably from about 0.01 to about 0.2 moles per mole equivalent. The amount of the higher alkali metal salt catalyst is from about 0.00001 to about 0.05 gram-atom of the higher alkali metal per mole equivalent of sodium or alkaline earth metal carbonate or bicarbonate; and such that the ratio of gram-atoms of the higher alkali metal to the mole equivalent of the lithium, sodium, or alkaline earth metal (organic) salt is less than one. Where the preferred amount of the lithium, sodium, or alkaline earth metal salt is used, it is preferred to employ from about 0.00002 to about 0.01 gram-atoms of the higher alkali metal per mole equivalent of sodium or alkaline earth metal carbonate or bicarbonate. The gram-atom ratio of the higher alkali metal to the combined total gram equivalents of lithium, sodium and alkaline earth metal, (carbonate, bicarbonate, and organic salt) should be less than about 0.05, preferably less than about 0.005, and most preferably, less than about 0.001.

The amount of the lithium, sodium or alkaline earth metal salt and the amount of the higher alkali metal salt catalyst can be adjusted separately or simultaneously to obtain the desired reaction rate and, hence, these salts may be used in amounts greater or lesser than the ranges stated above.

The lithium, sodium, or alkaline earth metal salts of organic acids that are useful are the same as those listed above. Preferred salts are the formates, acetates, propanoates, benzoates, benzene sulfonates and p-toluene sulfonates. Sodium salts are most preferred.

The higher alkali metal salt catalysts are of the general formula

MX"

where M is potassium, cesium or rubidium; X" is the residue of an organic acid (vide supra); the residue of an inorganic acid such as carbonate, bicarbonate, halide and the like; the residue of a phenol such as phenoxide, naphthoxide, halo- and/or alkyl-substituted phenoxides, naphthoxides and the like; the residue of an alcohol such as methoxide, ethoxide, propoxide, n-butoxide, t-butoxide and the like; and a hydroxyl group. The salts wherein X" is an acetate, propanoate, oxalate, trichloroacetate, benzoate, benzene sulfonate, p-toluene sulfonate, trifluoromethane sulfonate, methane sulfonate, carbonate, bicarbonate, fluoride, chloride, and phenoxide are preferred. Potassium salts are the most preferred.

All of the reactions discussed above may be advantageously performed in the presence of small amounts of cupric or cuprous ions. A wide range of copper compounds may be used, both cupric and cuprous compounds being usable in accordance with the present invention. The copper compounds used should be stable under the polymerization conditions and it is preferred that the copper compounds be essentially anhydrous. Copper compounds which can be used include cuprous chloride, cupric chloride, cupric acetylacetonate, cuprous acetate, cupric hydroxide, cuprous oxide, cupric oxide, basic cupric carbonate and basic cupric chloride. Although a basic copper compound may be used, it is still necessary to use an at least stoichiometric amount of the sodium or alkaline earth metal carbonate or bicarbonate.

The proportion of the copper compound used is preferably not more than one mole percent based on the total reagents employed; preferably, less than 0.4 mole percent of the copper compound based on the reagents is used. It is generally desirable to employ at least 0.1 mole percent of the copper derivative. Obviously, the optimum amount of the cupric or cuprous ions will depend on the reagents and on the type of the copper derivative employed.

In all of the embodiments of this invention, the total amount of sodium or alkaline earth metal carbonate and/or bicarbonate and of the alkali and alkaline earth metal salt should be such that there is at least one atom or atom equivalent of total alkali and alkaline earth metal for each phenol group, regardless of the anion (carbonate, bicarbonate, halide, carboxylate, etc. . . .). Likewise, where a halophenol is employed, there should be at least one atom or atom equivalent of alkali and alkaline earth metal per mole of halophenol.

Preferably, from about 1 to about 1.2 atoms or atom equivalents of alkali or alkaline earth metal for each phenol group are used. An excess of total alkali and alkaline earth metal may be employed. Hence, there may be about 1 to about 1.7 atoms or atom equivalents of alkali and alkaline earth metal per phenol group. While the use of a large excess of alkali and alkaline earth metal may give rise to faster reactions, there is the attendant risk of cleavage of the resulting polymer, particularly when using high temperatures and/or the more active alkali metal salts.

The reaction is carried out by heating a mixture of one or more of the compounds (6)–(10), one or more bisphenols, and one or more dihalobenzenoid or dinitrobenzenoid compounds and/or nitro or halophenols at a temperature of from about 40° to about 400° C. The reaction is conducted in the presence of added base as hereinabove defined.

The sodium or alkaline earth metal carbonate, bicarbonate or halide and the organic salts should be anhydrous although, if hydrated salts are employed where the reaction temperature is relatively low, e.g., 40° to 250° C., the water should be removed, e.g., by heating under reduced pressure, prior to reaching the reaction temperature. It is also preferred that the higher alkali metal salt catalysts be anhydrous; however, these latter salts are employed in amounts such that the hydrated forms can also be used.

Where high reaction temperatures (>250° C.) are used, it is not necessary to dehydrate the carbonate, bicarbonate or halide and the organic salts first as any water is driven off rapidly before it can adversely affect the course of the reaction. Optionally, an entraining organic medium such as toluene, xylene, chlorobenzene, and the like can be used to remove the water from the reaction mixture.

The bisphenol(s), the compounds (6)–(10), and the dinitro- or dihalobenzenoid compound(s) should be used in substantially equimolar amounts when maximum molecular weight is sought. However, a slight excess, up to 5 mole percent of the dihalide or the dinitro compound, or of the diphenol, may be employed, if desired. An excess of one over the other leads to the production of low molecular weight products which can be desirable when the process is directed to making oligomers for example, for block polymer formation.

The reaction may be carried out in the presence of an inert solvent, or partially in the absence of a solvent, or in the absence of a solvent.

Preferably, a solvent is employed and is an aliphatic or aromatic sulphoxide or sulphone of the formula

where x is 1 or 2 and $R_3$ and $R_3'$ are alkyl or aryl groups and may be the same or different. R and R' may together form a divalent radical. Preferred solvents include dimethyl sulphoxide, dimethyl sulphone, sulpholane (1,1 dioxothiolan), or aromatic sulphones of the formula

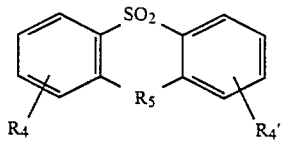

where $R_5$ is a direct link, an oxygen atom or two hydrogen atoms (one attached to each benzene ring) and $R_4$ and $R'_4$, which may be the same or different, are hydrogen atoms or phenyl groups. Examples of such aromatic sulphones include diphenylsulphone, ditolyl sulphone, tolylphenyl sulphone, dibenzothiophene dioxide, phenoxathiin dioxide and 4-phenylsulphonyl biphenyl. Diphenylsulphone is the preferred aromatic sulfone solvent. Other very useful and preferred solvents that may be used, include N,N-dimethyl formamide, N-methyl-2-pyrolidone, N,N-dimethylacetamide, and N-cyclohexyl pyrolidone. In another embodiment, the reaction is started in a relatively low boiling polar aprotic solvent such as dimethyl formamide, dimethylacetamide, dimethyl sulfoxide, N-methylpyrolidone, and the like. Heating at reflux results in the formation of low molecular weight product with attendant precipitation. The solvent may be removed and the low molecular weight product may be advanced if desired, by solid-state polymerization, i.e., by heating to a temperature in the range of from about 200° to about 400° C.; preferably, an inert atmosphere is maintained during this latter step.

The reaction temperature is in the range of from about 40° to about 400° C. and will depend on the nature of the reactants and the solvent, if any, employed. The reactions are preferably carried out at ambient pressure. However, higher or lower pressures can also be used. The reaction is generally carried out in an inert atmosphere.

For the production of some poly(ether imides), it may be desirable to commence reaction at one temperature, e.g., at about 80° to 100° C. and to increase the temperature as the reaction ensues. This is particularly necessary when making high molecular weight polymers having only a low solubility in the solvent. Thus, there it is desirable to increase the temperature progressively to maintain the polymer in solution as its molecular weight increases.

It is noted that the aforementioned processes are applicable not only to the synthesis of the copoly(etherimides) of the instant invention, but to the preparation of homopoly(etherimides) as well. The condensation of the dihalo- or dinitro-derivatives (6) to (10) with bisphenol di-salts has been described. See U.S. Pat. Nos. 3,787,364; 3,838,097; 3,847,869; and 3,852,242. The self-condensation of

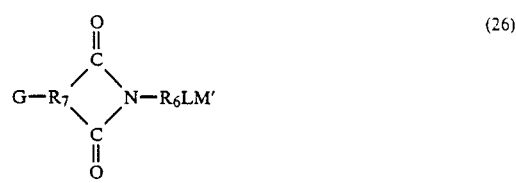

where $R_7$ is a trivalent $C_6$–$C_{13}$ aromatic organic radical; $R_6$ is a divalent $C_6$–$C_{30}$ aromatic organic radical; L is selected from —O— or —S—; G is selected from the class consisting of chloro, fluoro, or nitro; and M' is an alkali metal ion or an ammonium ion, is the subject of U.S. Pat. No. 4,297,474. The above quoted methods require the preparation of the phenolic salt prior to its polycondensation with the nitro- or halo- derivatives. In one instance, U.S. Pat. No. 3,838,097, the use of an alkali metal carbonate ($K_2CO_3$) for the in-situ preparation of the phenolic salt is described and claimed. The bases described herein are remarkable in that they allow for the preparation of high molecular weight, gel-free poly(etherimides) and copoly(etherimides) at high rates. None of these bases are mentioned in the above-quoted references.

The poly(etherimides) and copoly(etherimides) of the instant invention exhibit a reduced viscosity of from about 0.05 to about 5.0, and preferably, from about 0.1 to about 2.0 dl/g as measured in an appropriate solvent at 25° C.

The copoly(etherimides) of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers; ultraviolet light stabilizers, plasticizers, and the like.

The materials of this invention may be fabricated into any desired shape, i.e., molding, coatings, films, or fibers. They are also useful in blends with a variety of other polymers.

EXAMPLES

The following examples serve to give specific illustrations of the practice of this invention but they are not intended in any way to limit the scope of this invention

Example 1

Preparation of a copoly(ether-imide-ether) via the reaction shown:

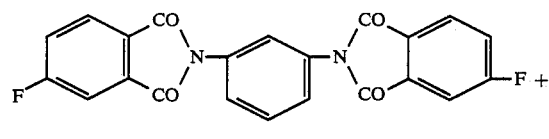

(27), 0.5 moles

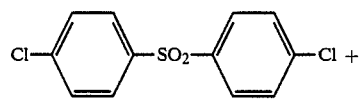

(18), 0.5 moles

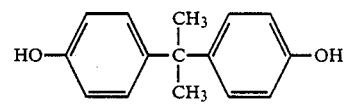

(28) 1.0 moles

A one liter flask is equipped with a mechanical stainless steel stirrer, nitrogen sparge tube, thermometer, Dean Stark trap and condenser. The apparatus is charged with 45.66 g (0.2 moles) of bisphenol-A(28),
40.43 g (0.1 moles) of the diimide (27),
28.72 g (0.1 moles) of 4,4'-dichlorodiphenyl sulfone (18),
20.16 g (0.19 moles) of sodium carbonate
1.354 g (0.01 moles) of potassium carbonate,
500 ml of N-methyl-2-pyrrolidone, and
100 ml of toluene.

The apparatus is evacuated and filled with nitrogen. A nitrogen atmosphere and vigorous stirring are maintained throughout the experiment. The mixture is heated to about 100°–110° C. with continuous co-distillation of water and toluene. After about 2 hours the temperature is raised to about 150°–160° C. and 100 ml of chlorobenzene are added to the reaction mixture. Heating at 150°–160° C. is continued for 5 hours, followed by coagulation in 2 liters of methanol. The fibrous polymer is washed twice with distilled water (one liter of water, 15 minutes of stirring per wash), once with 5 percent aqueous hydrochloric acid (700 ml of acid, 15 minutes of stirring), then again twice with distilled water and once with methanol.(one liter of solvent per wash, 15 minutes of stirring). The polymer is then dried in a vacuum oven, at about 80° C., till constant weight.

Examples 2–6

Using techniques that are similar to that described in Example 1, the following polymers are prepared:

EXAMPLES 2 to 6

| Example No. | Reactants and Molar Proportions | Base |
|---|---|---|
| 2. | HO—⌬—SO₂—⌬—OH + Cl—⌬—SO₂—⌬—Cl + (27)<br>1.0 moles    0.5 moles    0.5 moles | Na₂CO₃/KOCOCH₃<br>(0.9 moles/0.1 moles) |
| 3. | HO—⌬—⌬—OH + Cl—⌬—SO₂—⌬—Cl + (27)<br>1.0 moles    0.6 moles    0.4 moles | Na₂CO₃/KOCOCH₃<br>(0.9 moles/0.1 moles) |

-continued
EXAMPLES 2 to 6

| Example No. | Reactants and Molar Proportions | Base |
|---|---|---|
| 4. | 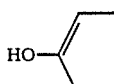 | Na$_2$CO$_3$/Potassium Benzoate (0.85 moles/0.15 moles) |
| 5. | 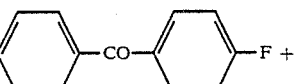 | Na$_2$CO$_3$/Potassium Benzoate (0.85 moles/0.15 moles) |
| 6. | 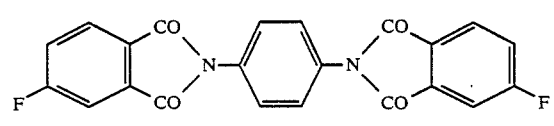 | Na$_2$CO$_3$/KOCOCH$_3$ (0.9 moles/0.1 moles) |

What is claimed:

1. A random poly(ether imide) comprising the repeat units:

—OE—OI—OE—OE'— wherein I is the residuum of one or more diimide benzenoid compounds; E is the residuum of a dihydric phenol or of a mixture of dihydric phenols; and E' is the residuum of an activated dihalo- or dinitrobenzenoid compound having an inert electron withdrawing group in at least one of the positions ortho or para to the halogen atoms or nitro groups, or of a mixture of such activated compounds; and where all of said residua are valently bonded to the ether oxygens through aromatic carbon atoms.

2. A copolymer as defined in claim 1 wherein the diimide benzenoid units I are selected from the group consisting of one or more of the following:

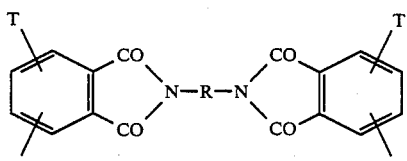

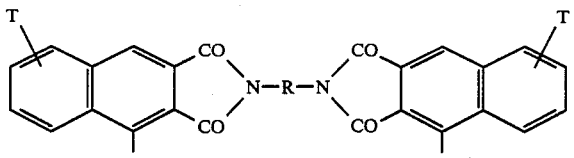

or isomers thereof, wherein the ether bonds are ortho or para to the imide carbonyls,

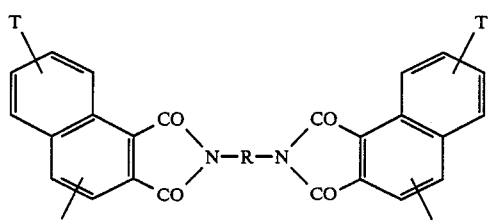

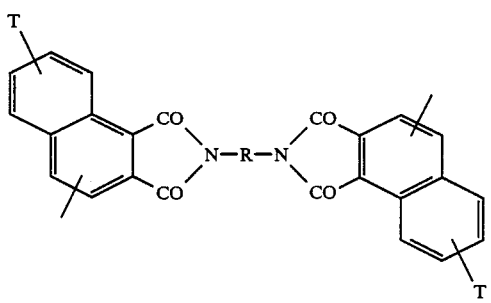

and

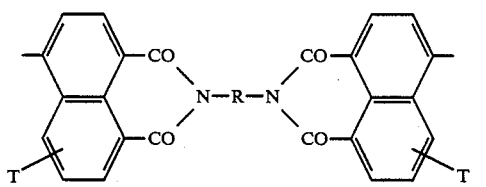

or isomers thereof wherein the ether bonds are ortho or para to the imide carbonyls; R is the a divalent organic radical, and T is hydrogen, lower alkyl or lower alkoxy.

3. A copolymer as defined in claim 2 wherein R is selected from the class consisting of (1) aromatic hydrocarbon radicals having 6 to 20 carbon atoms and halogenated derivatives thereof, (2) alkylene radicals and cycloalkylene radicals having from 2 to 20 carbon atoms, $C_2$ to $C_8$ alkylene terminated polydiorganosiloxanes, and (3) divalent radicals of the formula

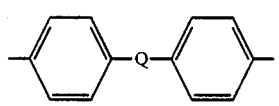

where Q is a member selected from the class consisting of a direct bond or

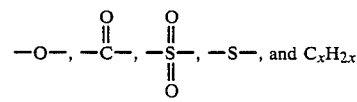

where x is a whole number from 1 to 5 inclusive.

4. A copolymer as defined in claim 2 wherein R is selected from the group of

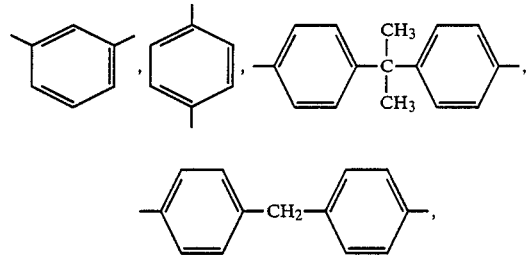

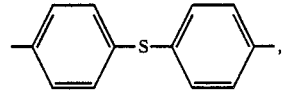

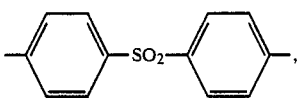

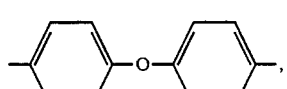

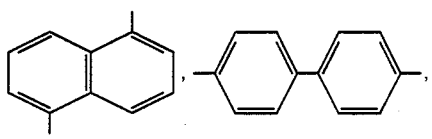

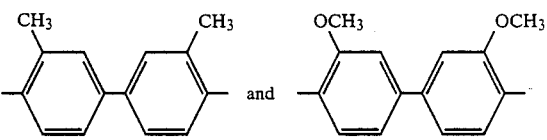

5. A copolymer as defined in claim 1 wherein E is the residuum of a dihydric phenol of the formula

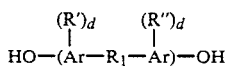

wherein Ar is an aromatic group, R' and R" can be the same or different inert substituent groups selected from the class of alkyl groups having from 1 to 4 carbon atoms, aryl groups, halogen atoms, and alkoxy groups having from 1 to 4 carbon atoms; the d's are independently integers having a value of from 0 to 4 inclusive; and $R_1$ is selected from the group of a direct bond, CO, O, S, S—S, SO, $SO_2$ and divalent hydrocarbon radicals such as alkylene, alkylidene, cycloalkylene, cycloalkylidene; the halogen, alkyl, aryl substituted alkylene, alkylidene, cycloalkylene, cycloalkylidene; and aryl radicals or radicals fused to both Ar groups.

6. A copolymer as defined in claim 5 wherein $R_1$ is a $C_1$ to $C_5$ alkylene or alkylidene radical.

7. A copolymer as defined in claims 5 or 6 wherein Ar is a phenylene group.

8. A copolymer as defined in claim 1 wherein E is the residuum of a dihydric phenol selected from the group of mononuclear diphenols and naphthalene diols.

9. A copolymer as defined in claims 1 or 5 wherein E is the residuum of one or more of the following

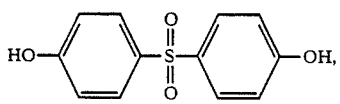

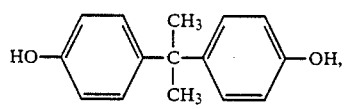

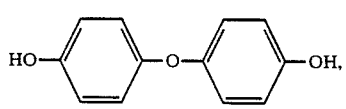

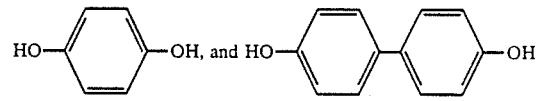

10. A copolymer as defined in claim 1 wherein the electron withdrawing group of the benzenoid compound is a monovalent group selected from halogen atoms, nitro groups, phenyl sulfone, alkyl sulfone, cyano, trifluoro methyl, nitroso and hetero-nitrogen.

11. A copolymer as defined in claim 1 wherein the electron withdrawing group of the benzenoid compound is a divalent group selected from

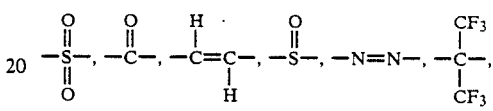

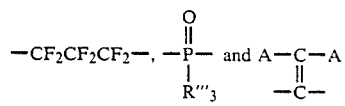

where $R'''_3$ is a hydrocarbon group and A is hydrogen or halogen.

12. A copolymer as defined in claims 1 or 10 or 11 wherein E' is the residuum of

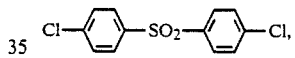

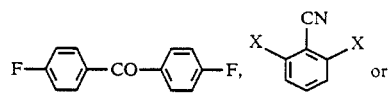

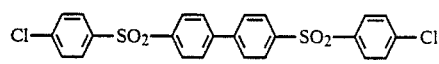

where X is chlorine or fluorine.

13. A copolymer as defined in claim 1 wherein the —OE—OE'— units are selected from the group of

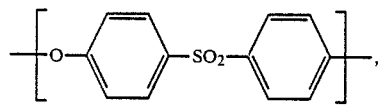

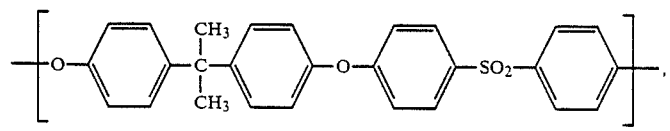

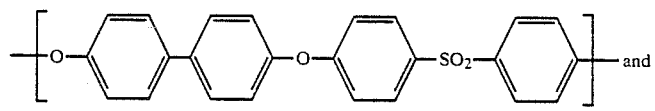 and

-continued

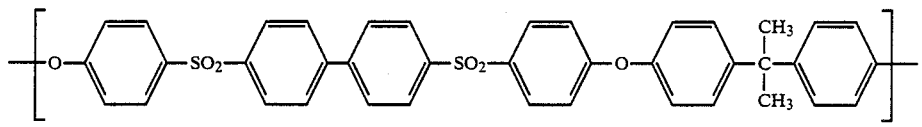

14. A copolymer as defined in claim 1 wherein the units —OE—OE'— are aryl ether ketone units comprised of ether oxygen and keto (carbonyl) groups interconnected by aromatic diradicals.

15. A copolymer as defined in claim 14 wherein the aromatic diradical is 1,4-phenylene.

16. A copolymer as defined in claims 14 or 15 wherein the aryl ether ketone units are characterized by one or more of the following formulae:

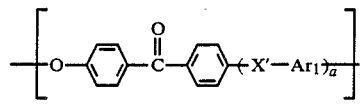

wherein Ar₁ is independently a divalent aromatic radical selected from phenylene, biphenylene, or naphthylene; X' is independently O, $$\overset{O}{\underset{\|}{C}},$$

SO₂, or a direct bond; and a is an integer of from 1 to 4; b, c, d and e are 0 to 1.

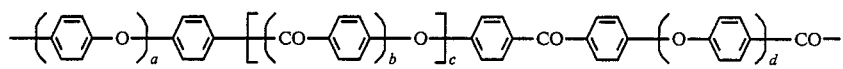

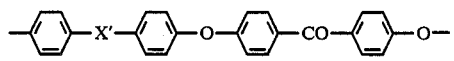

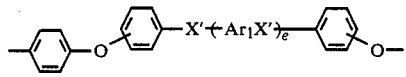

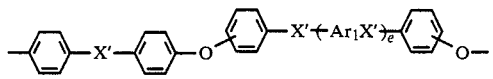

17. A copolymer as defined in claim 16 wherein the aryl ether ketone units are one or more of the formulae

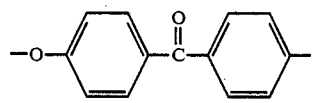

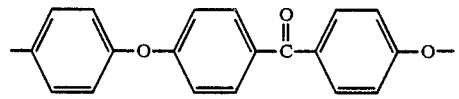

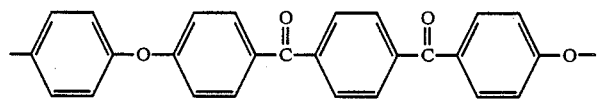

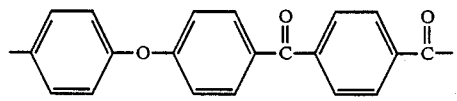

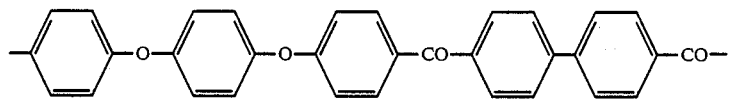

-continued
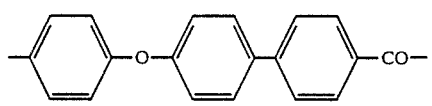
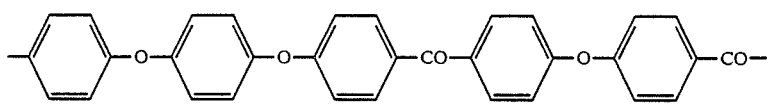
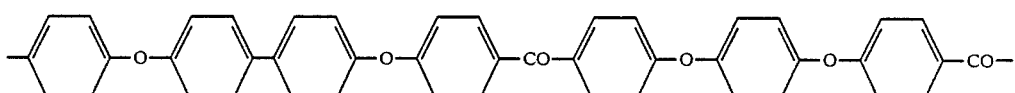
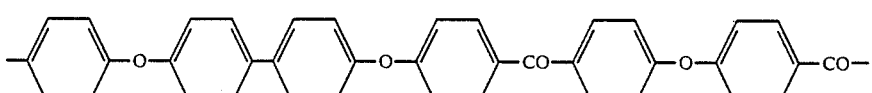
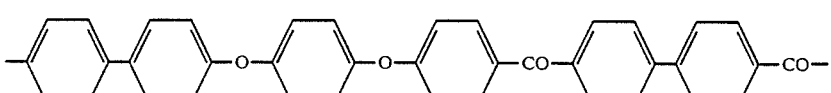
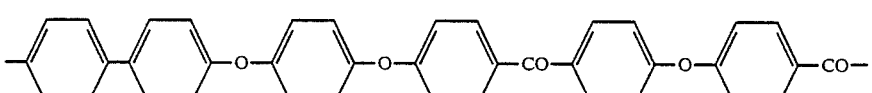
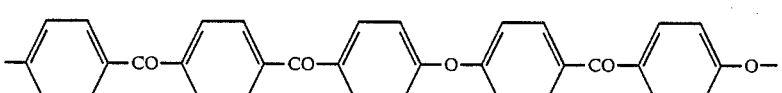
18. A poly(etherimide) copolymer as defined in claim 1 comprising the repeat units
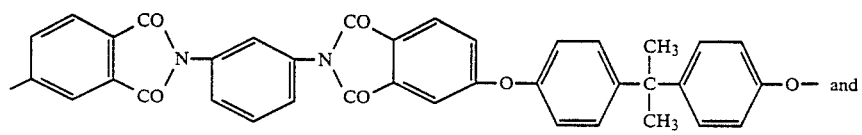
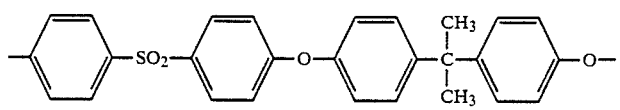
19. A poly(etherimide) copolymer as defined in claim 1 comprising the repeat units
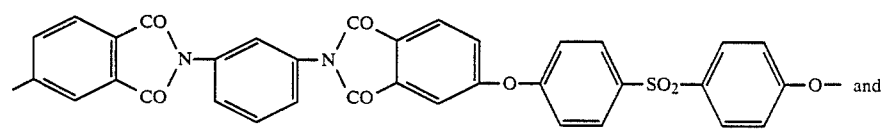
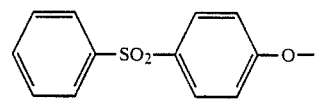
20. A poly(etherimide) copolymer as defined in claim 1 comprising the repeat units

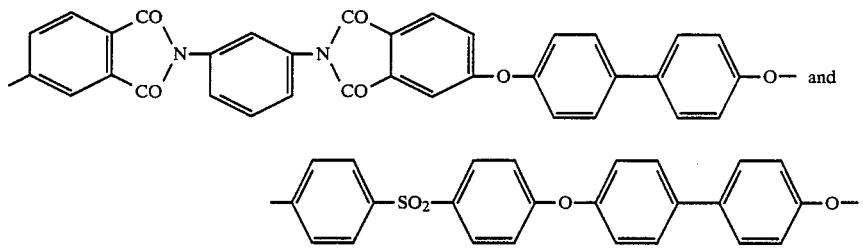
21. A poly(etherimide) copolymer as defined in claim 1 comprising the repeat units
22. A poly(etherimide) copolymer as defined in claim 1 comprising the repeat units
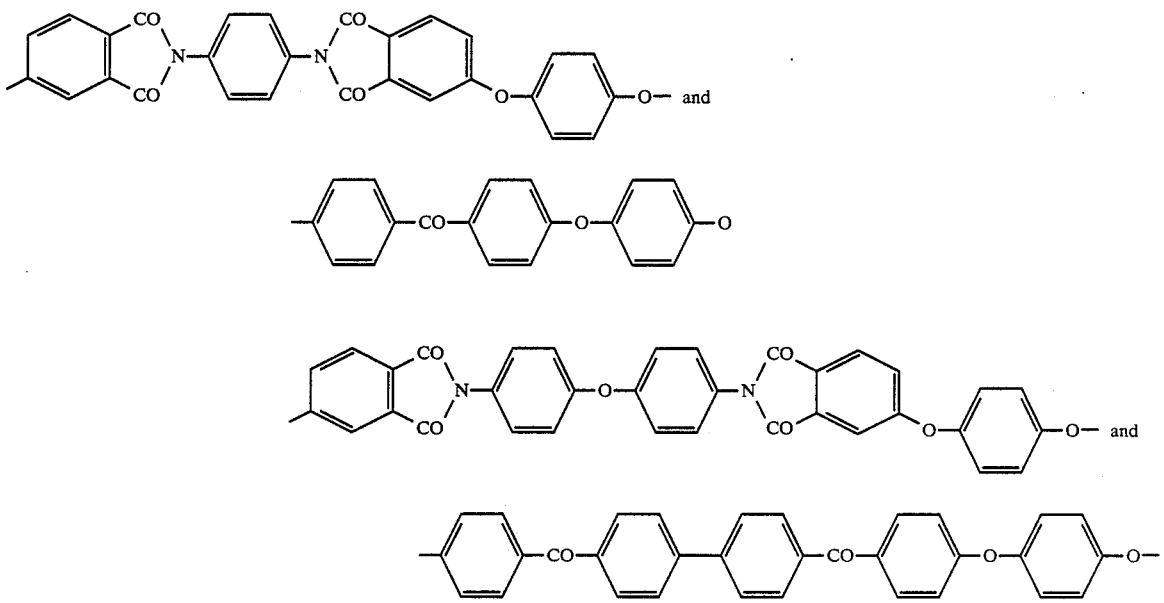
23. A poly(etherimide) copolymer as defined in claim 1 comprising the repeat units
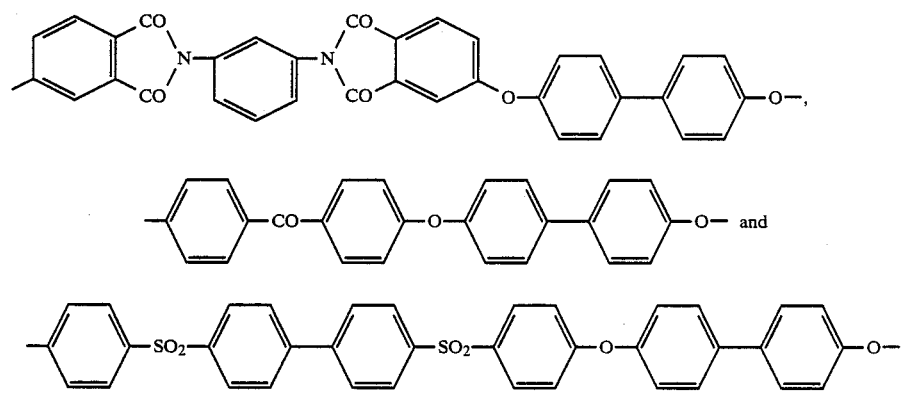
* * * * *